United States Patent
Fukumoto et al.

(10) Patent No.: US 12,391,793 B2
(45) Date of Patent: Aug. 19, 2025

(54) METHOD FOR PRODUCING POLYMERIZATION-REACTIVE LIQUID FORMULATION

(71) Applicant: RIMTEC Corporation, Tokyo (JP)

(72) Inventors: Naoki Fukumoto, Tokyo (JP); Nobuhito Kamei, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 559 days.

(21) Appl. No.: 17/918,367

(22) PCT Filed: Apr. 23, 2021

(86) PCT No.: PCT/JP2021/016481
§ 371 (c)(1),
(2) Date: Oct. 12, 2022

(87) PCT Pub. No.: WO2021/215533
PCT Pub. Date: Oct. 28, 2021

(65) Prior Publication Data
US 2023/0192942 A1    Jun. 22, 2023

(30) Foreign Application Priority Data
Apr. 24, 2020 (JP) .................. 2020-077314

(51) Int. Cl.
*C08G 61/08* (2006.01)
*B01F 27/94* (2022.01)
(Continued)

(52) U.S. Cl.
CPC ............ *C08G 61/08* (2013.01); *B01F 27/941* (2022.01); *B01F 35/90* (2022.01); *B01F 2035/98* (2022.01);
(Continued)

(58) Field of Classification Search
CPC ............... C08G 61/08; C08G 2261/11; C08G 2261/3321; B01F 27/941; B01F 35/90; B01F 2101/2204; B01F 2035/98
See application file for complete search history.

(56) References Cited

U.S. PATENT DOCUMENTS

| | | | | |
|---|---|---|---|---|
| 5,096,644 A | * | 3/1992 | Endo | ................ C08G 61/08 264/137 |
| 2005/0043541 A1 | * | 2/2005 | Walter | ................ B01J 31/2265 548/101 |

(Continued)

FOREIGN PATENT DOCUMENTS

| | | |
|---|---|---|
| JP | 3-169621 A | 7/1991 |
| JP | 8-156047 A | 6/1996 |

(Continued)

OTHER PUBLICATIONS

International Search Report dated Jun. 29, 2021, issued in counterpart International Application No. PCT/JP2021/016481 (2 pages).

*Primary Examiner* — Shane Fang
(74) *Attorney, Agent, or Firm* — WHDA, LLP

(57) ABSTRACT

A mixing head 3 which mixes a first preparative liquid formulation containing a norbornene-based monomer with a second preparative liquid formulation containing a metathesis polymerization catalyst includes a casing 4, a cap 7, and a mixing rotor 6. A plurality of protrusions 622 includes first protrusions 622a having a width in the axial direction of the mixing rotor 6 larger than that in the circumferential direction, and second protrusions 622b having a width in the axial direction of the mixing rotor 6 smaller than that in the circumferential direction. First and second protrusion rows 623a and 623b are alternately arranged, the first protrusion rows 623a being formed of the first protrusions 622a aligned (Continued)

at a predetermined interval, the second protrusion rows 623*b* being formed of the second protrusions 622*b* aligned at a predetermined interval.

16 Claims, 7 Drawing Sheets

(51) Int. Cl.
    *B01F 35/90*     (2022.01)
    *B01F 101/00*     (2022.01)

(52) U.S. Cl.
    CPC .. *B01F 2101/2204* (2022.01); *C08G 2261/11* (2013.01); *C08G 2261/3321* (2013.01)

(56) References Cited

U.S. PATENT DOCUMENTS

| | | |
|---|---|---|
| 2012/0259053 A1 | 10/2012 | Kamei |
| 2016/0244540 A1 | 8/2016 | Kamei |
| 2021/0121838 A1 | 4/2021 | Morikawa et al. |

FOREIGN PATENT DOCUMENTS

| | | |
|---|---|---|
| JP | 2000-102944 A | 4/2000 |
| JP | 2016-43508 A | 4/2016 |
| JP | 2019-150786 A | 9/2019 |
| WO | 03/062253 A1 | 7/2003 |
| WO | 2011/078256 A1 | 6/2011 |
| WO | 2015/046028 A1 | 4/2015 |

\* cited by examiner

METHOD FOR PRODUCING POLYMERIZATION-REACTIVE LIQUID FORMULATION

TECHNICAL FIELD

The present invention relates to a method for producing a polymerization-reactive liquid formulation used in reaction injection molding and the like.

BACKGROUND ART

Reaction injection molding is a known process to produce a resin molded body by bulk ring-polymerization of a monomer in the presence of a catalyst. In such reaction injection molding, if a Ru catalyst is used as the catalyst, mixing of the monomer with the catalyst immediately initiates the polymerization reaction. For this reason, in the reaction injection molding using the Ru catalyst, a polymerization-reactive liquid formulation is produced by mixing a monomer solution and a catalyst solution as preparative liquid formulations immediately before the reaction.

Traditionally, the monomer solution and the catalyst solution are mixed with a mixer having a function to mix two or more chemical solutions and eject the mixture. For example, the rotary mixer disclosed in Patent Document 1 includes a drive rotor and two driven rotors accommodated in a mixing space inside a housing. Rotation of the drive rotor causes the two driven rotors engaged therewith to rotate in the reverse direction. Thereby, two chemical solutions fed from an upper portion of the housing are fed downward while being mixed under pressure by the drive rotor and the driven rotors, and are ejected as a mixed solution from an ejection port disposed in a lower portion of the housing.

RELATED ART DOCUMENTS

Patent Documents

Patent Document 1: Japanese Unexamined Patent Application Publication No. 2019-150786

SUMMARY OF THE INVENTION

Problem to be Solved by the Invention

In the reaction injection molding using the Ru catalyst, the ratio between the flow rates of the monomer solution and the catalyst solution are set such that the amount of the monomer solution is significantly larger than that of the catalyst solution. Unfortunately, the rotary mixer described above is not adaptable to the mixing in the ratio of the flow rates such that the amount of one of the chemical solutions is significantly larger than that of the other. For this reason, when the monomer solution is mixed with the Ru catalyst solution by the rotary mixer, the monomer solution in a larger amount may cause reverse flow of the Ru catalyst solution, hindering the desired polymerization reaction in some cases. Furthermore, in the reaction injection molding using the Ru catalyst, a preparative liquid formulation containing a filler is used in many cases. Unfortunately, the rotary mixer described above cannot mix the liquid formulation containing a filler because the clearance is almost zero between the rotor and the inner circumferential surface of the housing.

An object of the present invention is to provide a method for producing a polymerization-reactive liquid formulation which enables homogeneous mixing of preparative liquid formulations fed in a wide range of flow rate ratio.

Means for Solving Problems

[1] The method for producing a polymerization-reactive liquid formulation according to the present invention, the method comprising: a step of feeding a first preparative liquid formulation attaining a norbornene-based monomer and a second preparative liquid formulation containing a metathesis polymerization catalyst to a mixing head of a rotary mixer; and a step of mixing the first preparative liquid formulation with the second preparative liquid formulation by the mixing head, wherein the mixing head includes a casing including a cylindrical mixing chamber closed at one end and open at the other end, and an ejection port disposed at the closed end of the mixing chamber to eject the polymerization-reactive liquid foundation; a cap attached to the open end of the mixing chamber to seal the mixing chamber, the cap including a first chemical solution feeding port which feeds the first preparative liquid formulation to the mixing chamber and a second chemical solution feeding port which feeds the second preparative liquid formulation to the mixing chamber; a mixing rotor including a cylindrical rotor body which is accommodated inside the mixing charmer to be rotatable around the central axis of the mixing chamber and extends in the axial direction of the mixing chamber; a connection disposed at one end of the rotor body to be connected to a driving source for the rotary mixer through a connection hole disposed in the cap; and a plurality of protrusions which is disposed on the circumferential surface of the rotor body to mix the first preparative liquid formulation with the second preparative liquid formulation by rotation of the rotor body; and a bearing member attached to the closed end of the mixing chamber to rotatably support the other end of the rotor body, the plurality of protrusions includes first protrusions and second protrusions, the first protrusions having a width in the axial direction of the rotor body larger than that in the circumferential direction thereof, the second protrusions having a width in the axial direction of the rotor body smaller than that in the circumferential direction thereof, and first and second protrusion rows are alternately arranged at a predetermined interval in the circumferential direction of the rotor body, the first protrusion rows being formed of the first protrusions aligned at a predetermined interval in the axial direction of the rotor body, the second protrusion rows being formed of the second protrusions aligned at a predetermined interval in the axial direction of the rotor body.

[2] In the above embodiment, the first protrusion rows may be arranged such that the first protrusions in each first protrusion row are positioned offset in the axial direction from the first protrusions in a first protrusion row adjacent to the first protrusion row with a second protrusion row interposed therebetween.

[3] In the above embodiment, the second protrusion rows may be arranged such that the second protrusions in each second protrusion row are positioned offset in the axial direction from the second protrusions in a second protrusion row adjacent to the second protrusion row with a first protrusion row interposed therebetween.

[4] In the above embodiment, the mixing head may be formed as a unit to be detachably attachable to the body of the rotary mixer.

[5] In the above embodiment, the first and second protrusion rows may be alternately arranged in positions on the circumferential surface of the rotor body divided to 6 to 18 even-numbered regions in the circumferential direction.

[6] In the above embodiment, the mixing head may have an inner volume of 1 to 20 mL, the inner volute being defined by the inner circumferential surface of the mixing chamber, the inner surface of the cap, and the outer circumferential surface of the mixing rotor.

[7] In the above embodiment, an interval between the inner circumferential surface of the mixing chamber and the circumferential surface of the mixing rotor including the protrusions may be 1 to 7 mm, and an interval between the inner circumferential surface of the mixing chamber and the first and second protrusions may be 0.1 to 1 mm.

[8] In the above embodiment, the ratio of the flow rate of the first preparative liquid formulation to that of the second preparative liquid formulation may be 100:100 to 100:0.2.

[9] In the above embodiment, the ratio of the flow rates may be 100:3.5 to 100:0.4.

[10] In the above embodiment, the first preparative liquid formulation may further contain a filler.

[11] In the above embodiment, the metathesis polymerization catalyst contained in the second preparative liquid formulation may be a ruthenium carbene complex.

[12] In the above embodiment, the casing may include an ejection nozzle provided with the ejection port, and the ejection nozzle may include a mount to which an attachment for charging or applying the polymerization-reactive liquid formulation to a molding target is attached.

[13] In the above embodiment, the mixing head may further include a mixing head cooler which cools the first preparative liquid formulation and the second preparative liquid formulation fed to the mixing chamber.

[14] In the above embodiment, the rotary mixer may include a first injector connected to the first chemical solution feeding port through a first pipe to feed the first preparative liquid formulation to the mixing head; a second injector connected to the second chemical solution feeding port through a second pipe to feed the second preparative liquid formulation to the mixing head; and a first pipe cooler disposed in the first pipe to cool the first preparative liquid formulation passing through the first pipe.

[15] In the above embodiment, the rotary mixer may further include a second pipe cooler disposed in the second pipe to cool the second preparative liquid formulation passing through the second pipe.

[16] The method for producing a polymer according to the present invention, comprising a step of preparing a polymerization-reactive liquid formulation by the production netted according to any one of claims 1 to 15; and a step of polymerizing the polymerization-reactive liquid formulation.

Effects of Invention

Rotation of the mixing rotor causes the first protrusions and the second protrusions to push the first preparative liquid formulation and the second preparative liquid formulation, thereby flowing the first preparative liquid formulation and the second preparative liquid formulation in the casing. At this time, the gaps formed between the first protrusions, the gaps formed between the second protrusions, and the gaps formed between the first protrusions and the second protrusions define a flow path for the first preparative liquid formulation and the second preparative liquid formulation. The first preparative liquid formulation and the second preparative liquid formulation are repeatedly split and merged through the flow path. Thereby, preparative liquid formulations fed in a wide range of flow rate ratio can be homogeneously mixed.

DESCRIPTION OF EMBODIMENTS

Figure 1:
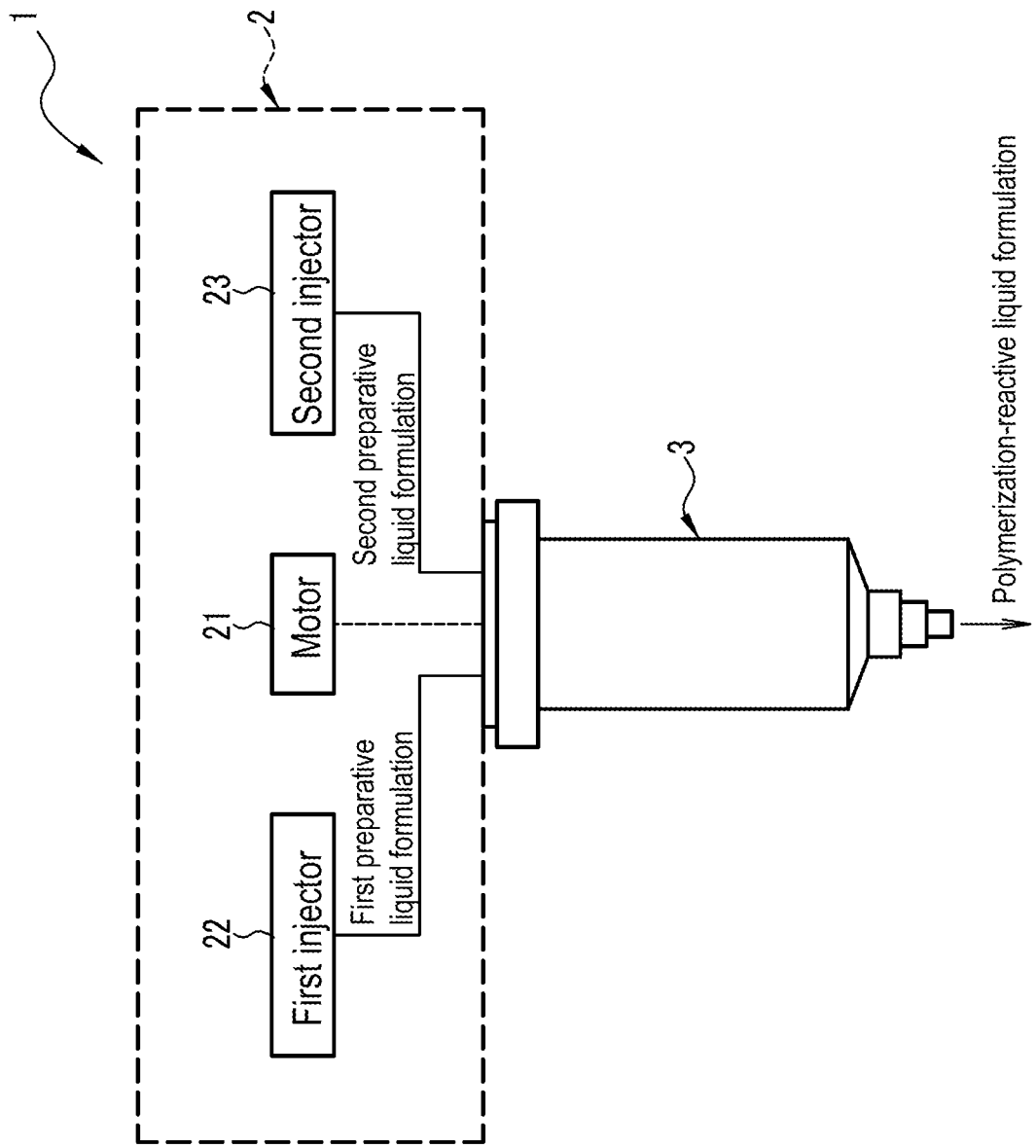
FIG. 1 is a schematic view showing a configuration of a rotary mixer according to the present embodiment.

Hereinafter, an embodiment according to the present invention will be described with reference to the drawings. The present embodiment relates to a rotary mixer which mixes a first preparative liquid formulation and a second preparative liquid formulation to produce a polymerization-reactive liquid formulation, and feeds the produced polymerization-reactive liquid formulation as a sealing material, a heat dissipating material, or the like to electrical parts, electronic parts, trace members, and the like. As shown in FIG. 1, a rotary mixer 1 according to the present embodiment includes a mixer body 2, and a mixing head 3 attached to the mixer body 2. The mixer body 2 feeds a first preparative liquid formulation containing a norbornene-based monomer and a second preparative liquid formulation containing a metathesis polymerization catalyst to the mixing head 3. The mixing head 3 mixes the fed first preparative liquid formulation and the fed second preparative liquid formulation to produce a polymerization-reactive liquid formulation, and feeds the polymerization-reactive liquid formulation to a molding target such as an electrical cart.

Figure 2:
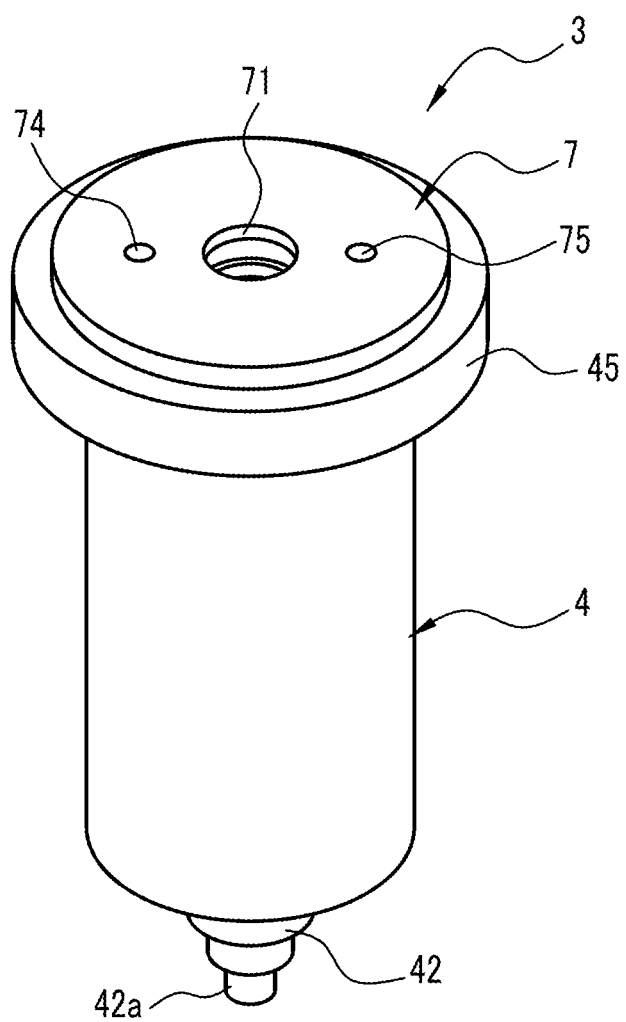
FIG. 2 is a perspective view showing an appearance of the mixing head shown in FIG. 1.
Figure 3:
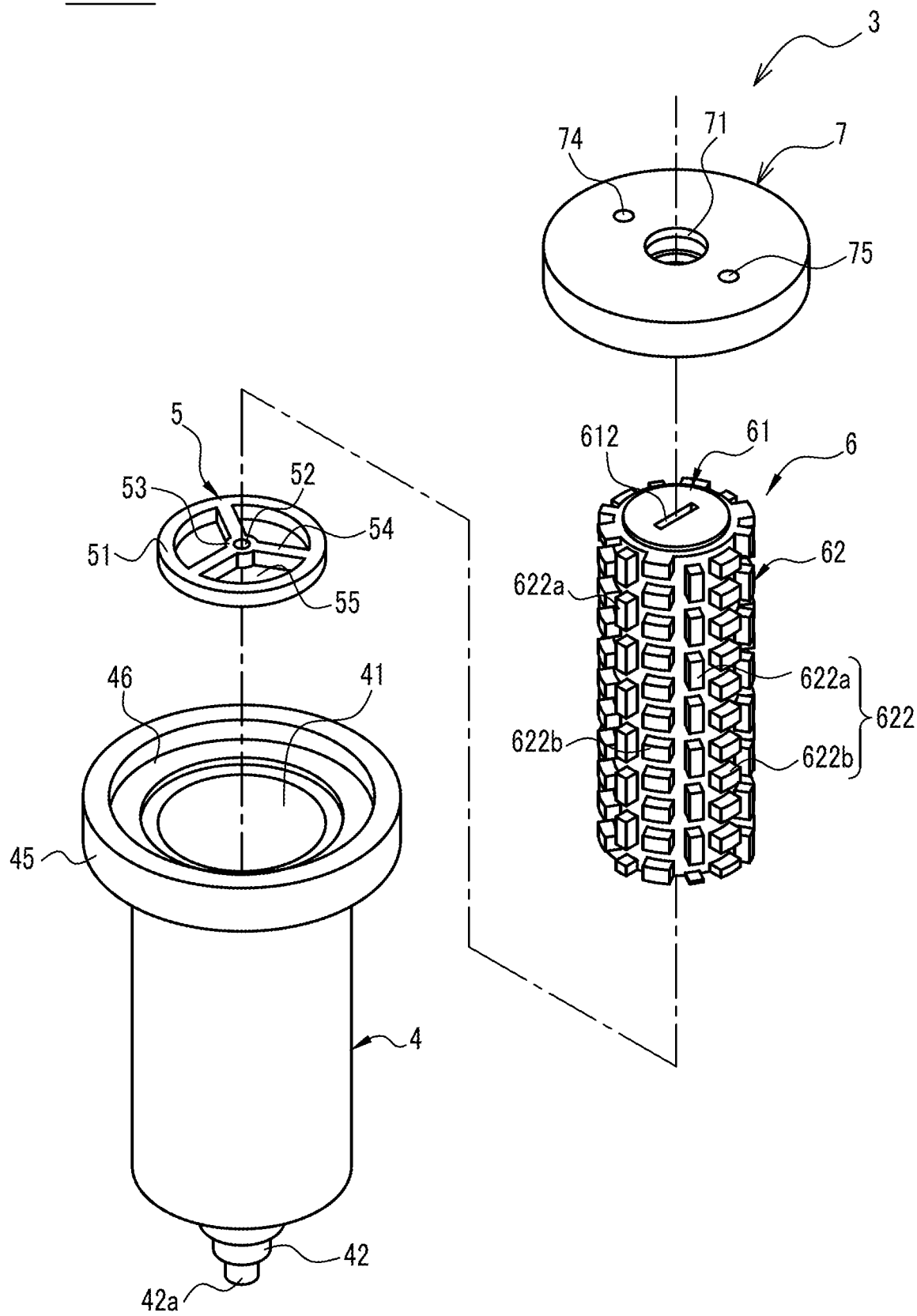
FIG. 3 is an exploded perspective view shewing the configuration of the mixing head shown in FIG. 2.
Figure 4:
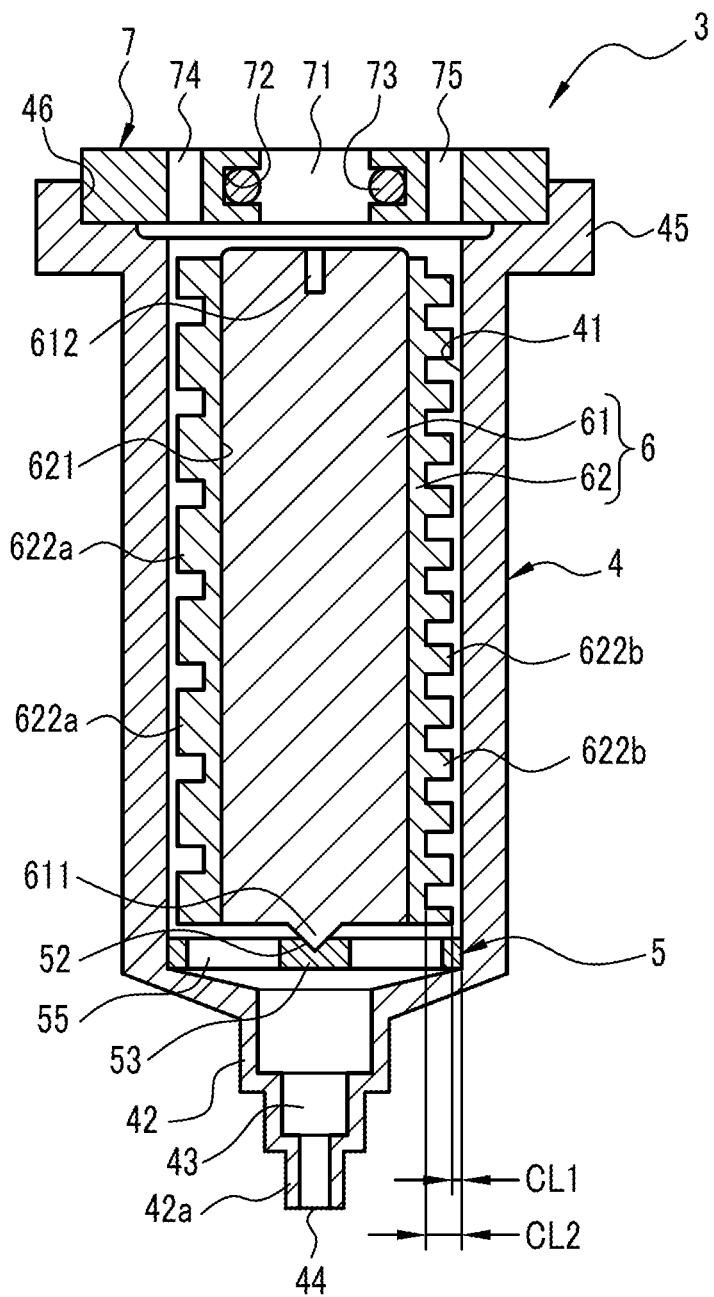
FIG. 4 is a cross-sectional view of the mixing head shown in FIG. 2.

To begin with, the mixing head 3 will be described. FIGS. 2, 3, and 4 are a perspective view of the appearance of the mixing head 3, an exploded perspective view of the mixing head, and a cross-sectional view thereof, respectively. The mixing head 3 includes a casing 4 having an approximately cylindrical shape, a bearing member 5 attached to the inside of the casing 4, a mixing rotor 6 accommodated inside the casing 4, and a cap 7 for sealing the casing 4. The casing 4, the bearing member 5, the mixing rotor 6, and the cap 7 are made of a synthetic resin, a metal, a ceramic, or the like, and are formed into a unit as the mixing head 3 which constitutes the rotary mixer 1 and is detachably attachable to the mixer body 2.

The casing 4 has a hollow cylindrical shape. A cylindrical mixing chamber 41 is coaxially disposed inside the casing 4 to accommodate the bearing member 5 and the mixing rotor 6. One end (lower end) of the mixing chamber 41 is closed, and the other end (upper end) thereof is open. A cylindrical ejection nozzle 42 having a reduced diameter is coaxially disposed in a lower portion of the casing 4. An ejection path 43 in communication with the mixing chamber 41 is coaxially formed inside the ejection nozzle 42. The lower end of the ejection path 43 is open on the lower end surface of the ejection nozzle 42 to form an ejection port 44 for ejecting the polymerization-reactive liquid formulation. A mount 42*a* to which an attachment such as an injection needle or a brush is attachable is disposed at the tip of the ejection nozzle 42 to charge or apply the polymerization-reactive liquid formulation to the molding target, such as an electrical part. Use of the attachment attached to the mount 42*a* enables feed of the polymerization-reactive liquid formulation to fine portions of an electrical or electronic part, or the like.

An approximately disk-like flange 45 having a diameter larger than the outer diameter of the casing 4 is disposed in an upper portion of the casing 4. An open recess 46 which is in communication with the mixing chamber 41 and has an inner diameter larger than the inner diameter of the mixing chamber 41 is disposed in the inner circumference of the flange 45. For example, when the mixing head 3 is attached to the mixer body 2 using a cap nut, the flange 45 serves as a fixation portion for the cap nut.

The bearing mercer 5 includes a ring portion 51 having an approximately annular shape and having a diameter slightly smaller than the inner diameter of the mixing chancer 41 in the casing 4, a bearing 53 which is disposed in an axial center position in the center of the ring portion 51 and includes a conical bearing cavity 52, and three spokes 54 connecting the ring portion 51 to the bearing 53. Three openings 55 defined by the ring portion 51, the bearing 53, and the three spokes 54 serve as passages for sending the polymerization-reactive liquid formulation from the mixing chamber 41 to the ejection path 43.

The mixing rotor 6 includes a cylindrical rotor body 61 which is accommodated inside the mixing chamber 41 to be rotatable around the central axis of the mixing chamber 41 and extends in the axial direction of the mixing chamber 41; and a mixing member 62 fitted into the outer periphery of the rotor body 61. A support shaft 611 having a conically projected shape is disposed in the axial center position on the lower end surface of the rotor body 61. A keyway 612 used for connection to the meter 21 of the mixer body 2 is disposed on the upper end surface of the rotor body 61.

The mixing member 62 has a hollow cylindrical shape, and a cylindrical rotor insertion 621 is coaxially disposed inside thereof. The rotor body 61 is inserted into the rotor insertion 621. A plurality of protrusions 622 is disposed on the outer circumferential surface of the mixing marker 62 to mix the first preparative liquid formulation with the second preparative liquid formulation by rotation of the mixing rotor 6.

Figure 5:
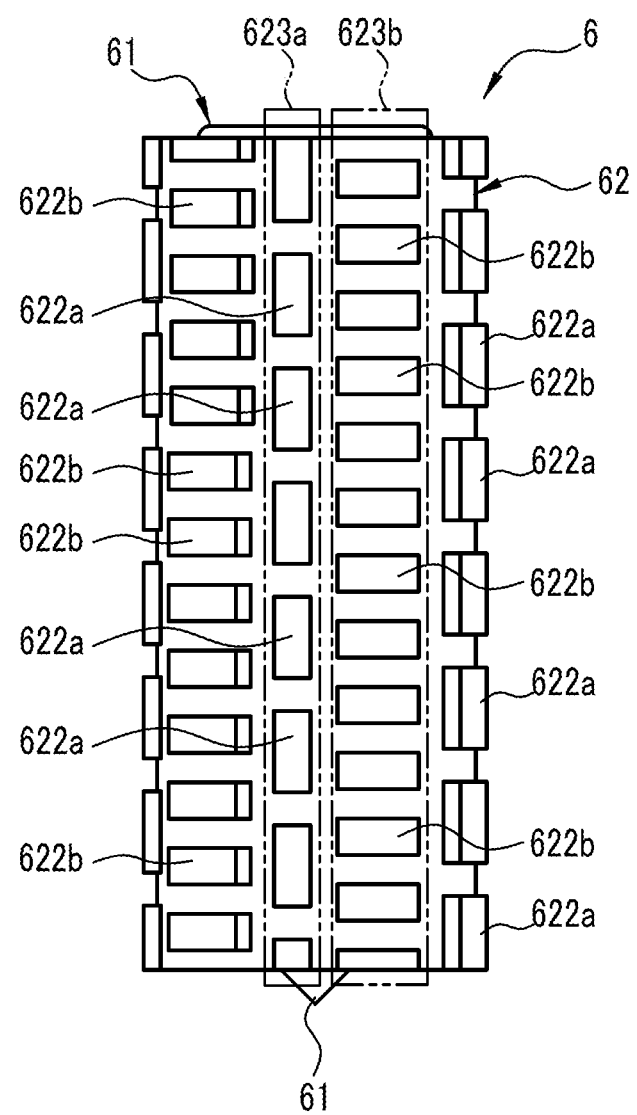
FIG. 5 is a side view of the mixing rotor shown in FIG. 3.

The protrusions 622 include first protrusions 622*a* having a width in the axial direction of the rotor body 61 larger than that in the circumferential direction thereof, and second protrusions 622*b* having a width in the axial direction of the rotor body 61 smaller than that in the circumferential direction thereof. As shown in FIG. 5, which is a side view of the mixing rotor 6, the first protrusions 622*a* are aligned at a predetermined interval in axial direction of the rotor body 61 to form a first protrusion row 623*a*, and the second protrusions 622*b* are aligned at a predetermined interval in the axial direction of the rotor body 61 to form a second protrusion row 623*b*. The first and second protrusion rows 623*a* and 623*b* are alternately arranged at a predetermined interval in the circumferential direction of the rotor body 61. More specifically, the first and second protrusion rows 623*a* and 623*b* are alternately arranged, for example, on the circumferential surface of the rotor body 61 divided into 6 to 19 even-numbered regions, more specifically 12 regions, in the circumferential direction.

The first protrusion rows 623*a* are arranged such that the first protrusions 622*a* in each first protrusion row are positioned offset in the axial direction from the first protrusions in a first protrusion row 623*a* adjacent to the first protrusion row with a second protrusion row 623*b* interposed therebetween. Similarly, the second protrusion rows 623*b* are arranged such that the second protrusions 622*b* in each second protrusion row are positioned offset in the axial direction from the second protrusions in a second protrusion row 623*b* adjacent to the second protrusion row with a first protrusion row 623*a* interposed therebetween.

The cap 7 has a disk shape having an outer diameter approximately equal to the inner diameter of the open recess 46 disposed in the inner circumference of the flange 45 of the casing 4. The cap 7 has a thickness larger than the depth of the open recess 46. A connection hole 71 is disposed in the axial center position in the center of the cap 7, and a connection shaft (not shown) for connecting the motor 21 of the mixer body 2 to the keyway 612 of the rotor body 61 is inserted to the connection hole. An annular recessed groove 72 recessed radially outwardly is disposed on the inner circumferential wall of the connection hole 71, and an O-ring 73 is fitted into the annular recessed groove 72 in tight contact with the connection shaft to seal the inside of the mixing chamber 41. A first chemical solution feeding port 74 for feeding the first preparative liquid formulation to the mixing chamber 41 and a second chemical solution feeding port 75 for feeding the second preparative liquid formulation to the mixing chancer 41 are disposed on two sides of the connection hole 71 in the cap 7.

The mixing head 3 is assembled as follows. The bearing marker 5 is inserted into the mixing chamber 41 of the casing 4 from the opening at the upper end of the casing 4, and is arranged at the lower end of the mixing chamber 41 while the bearing cavity 52 of the bearing marker 5 faces upwardly. In the next step, the mixing rotor 6 is inserted from the lower end thereof into the mixing charter 41 of the casing 4, and the support shaft 611 disposed at the lower end of the mixing rotor 6 is rotatably supported by the bearing cavity 52 of the bearing member 5. Finally, the cap 7 is press fitted into the open recess 46 at the upper end of the casing 4. Thereby, the mixing chamber 41 is sealed while the mixing rotor 6 is rotatably accommodated inside the casing 4.

In the mixing head 3 according to the present embodiment, the interval CL1 between the inner circumferential surface of the mixing chamber 41 and the first and second protrusions 622*a* and 622*b* is controlled to preferably 0.1 to 1 mm, more preferably 0.2 to 0.8 mm to homogeneously mix the formulations even if the first preparative liquid formulation contains a filler. For example, the interval CL1 can be 0.5 mm. The interval CL2 between the inner circumferential surface of the mixing chamber 41 and the circumferential surface of the mixing rotor 6 including the protrusions 622 (circumferential surface of mixing marker 62) is controlled to preferably 1 to 7 mm, more preferably 1.5 to 7 mm, still more preferably 2 to 5 mm. For example, the interval CL2 can be 3.5 mm.

The mixing head 3 according to the present embodiment is used to feed the produced polymerization-reactive liquid formulation as a sealing material or a heat dissipating material to electrical parts or electronic parts. To complete the feed of the produced polymerization-reactive liquid formulation before solidified, the mixing head 3 has a relatively small inner volume. Specifically, the inner volume of the mixing head 3 is defined by the inner circumferential surface of the mixing chamber 41, the inner surface of the cap 7, and the outer circumferential surface of the mixing rotor 6, and is preferably 1 to 20 mL, more preferably 1 to 10 mL, still more preferably 2 to 5 mL, particularly preferably 2.5 to 4.5 mL. For example, the inner volume of the mixing head 3 can be 3.5 mL. Furthermore, in the mixing head 3 according to the present embodiment, to enable the mixing of the first preparative liquid formulation containing a norbornene-based monomer with the second preparative liquid formulation containing a metathesis polymerization catalyst, the ratio (mass ratio) of the flow rate of the first preparative liquid formulation to that of the second preparative liquid formulation "flow rate of first preparative liquid formulation:flow rate of second preparative liquid formulation" can be controlled to preferably 100:100 to 100:0.2, more preferably 100:100 to 100:0.3, still more preferably 100:100 to 100:0.4, particularly preferably 100:100 to 100:0.5, and also can be controlled to 100:100 to 100:1.1. When a Ru catalyst is used as the metathesis polymerization catalyst, for example, typically, the ratio (mass ratio) of the flow rates is preferably 100:3.5 to 100:0.4, more preferably 100:3.5 to 100:0.5.

As shown in FIG. 1, the mixing head 3 is attached to the mixer body 2 by fitting a cap nut (not shown) into the block 24 of the mixer body 2, the cat nut including a through hole to which the casing 4 is insertable, and a press fit portion which is brought into contact with the flange 45. The block 24 is in contact with the cap 7 of the mixing head 3 in the state where the mixing head 3 is attached to the mixer body 2. The mixer body 2 includes a motor 21 as a driving source for the mixing head 3. Using the connection shaft, the meter 21 is connected to the mixing rotor 6 in the mixing head 3 through a through hole (not shown) formed in the block 24 to rotate the mixing rotor 6.

The mixer body 2 includes a first injector 22 which feeds the first preparative liquid formulation containing a norbornene-based monomer to the mixing chamber 41 through the first chemical solution feeding port 74 of the mixing head 3, and a second injector 23 which feeds the second preparative liquid formulation containing a metathesis polymerisation catalyst to the mixing chamber 41 through the second chemical solution feeling port 75. The first injector 22 is connected to one end of a first pipe 221 through which the first preparative liquid formulation passes. The block 24 includes a through hole to which the first pipe 221 is insertable. The other end of the first pipe 221 is connected to the first chemical solution feeding pert 74 through the block 24. The second injector 23 is connected to one end of a second pipe 231 through which the second preparative liquid formulation passes. The block 24 includes a through hole to which the second pipe 231 is insertable, and the other end of the second pipe 231 is connected to the second chemical solution feeding port 75 through the block 24. The first injector 22 and the second injector 23 are configured with a feed pump having a measuring function. The feed pump used as the first injector 22 is a gear pup when the first preparative liquid formulation does not contain a filler, and is a snake pump when the first preparative liquid formulation contains a filler.

Preferably, the rotary mixer 1 according to the present embodiment further includes a first pipe cooler (not shown) disposed in the first pipe 221 to cool the first preparative liquid formulation which passes through the first pipe 221. Although not particularly limited, the first pipe cooler is a double-tube cooler, and includes a jacket concentrically attached to the outside of the first pipe 221. Although not particularly limited, the jacket is disposed in the first pipe 221 in a zone between the pump outlet of the first injector and the block 24. The first pipe cooler can cool the first preparative liquid formulation passing through the first pipe 221 by circulating a coolant inside the jacket. The jacket to be used can be a rubber tube, for example, although it is not particularly limited.

Preferably, the rotary mixer 1 according to the present embodiment further includes a second pipe cooler (not shown) disposed in the second pipe 231 to cool the second preparative liquid formulation which passes through the second pipe 231. Although not particularly limited, as in the first pipe cooler, the second pipe cooler is a double-tube cooler, and includes a jacket, concentrically attached to the outside of the second pips 231. Although not particularly limited, the jacket is disposed in the second pipe 231 in a zone between the pump outlet of the second injector and the block 24. The second pipe cooler can cool the second preparative liquid formulation passing through the second pipe 231 by circulating a coolant inside the jacket. Hereinafter, the first pipe cooler and the second pipe cooler are collectively referred to as "pipe cooler" depending on cases.

In the present embodiment, the rotary mixer 1 includes the pipe coolers, thereby suppressing an increase in temperatures of the first and second preparative liquid formulations due to influences from the ambient air before the first and second preparative liquid formulations are fed to the mixing chamber 41. In other words, in the present embodiment, the first preparative liquid formulation and the second preparative liquid formulation can be fed to the mixing chamber 41 aid mixed while their temperatures are kept low. Accordingly, compared to the case where the rotary mixer does not include a pipe cooler, in the present embodiment, the polymerization-reactive liquid formulation produced by mixing the first preparative liquid formulation with the second preparative liquid formulation can be kept at a low temperature, thus providing a further prolonged time (pot life) taken from ejection of the polymerization-reactive liquid formulation to solidification thereof.

Preferably, the rotary mixer 1 according to the present embodiment includes a mixing bead cooler (not shown) which cools the first and second preparative liquid formulations fed to the mixing chamber 41 in the mixing head 3. The mixing head cooler is not particularly limited, and is an air-cooling type plate cooler, and is disposed such that the cool plate of the cooler is in contact with the block 24. The mixing head cooler can cool the first preparative liquid formulation passing through the first pipe 221 inserted to the block 24 by dissipating heat received from the block 24 through the cool plate and a heat dissipating fin attached to the cool plate. Specifically, the mixing head cooler can cool the first preparative liquid formulation immediately before the first preparative liquid formulation is fed from the first chemical solution feeding port 74 to the mixing chamber 41. Similarly, the mixing head cooler can cool the second preparative liquid formulation passing through the second pipe 231 inserted to the block 24. Specifically, the mixing head cooler can cool the second preparative liquid formulation immediately before the second preparative liquid formulation is fed from the second chemical solution feeding port 75 to the mixing chamber 41.

In the present embodiment, even if the temperatures of the first and second preparative liquid formulations are increased due to influences from the ambient air, the notary mixer 1 including a mixing head cooler can cool the first and second liquid formulations immediately before the first and second liquid formulations are fed into the mixing chamber 41. Such a configuration enables feeding and mixing of the first and second preparative liquid formulations to the mixing chamber 41 while the temperatures are being kept low. Accordingly, compared to the rotary mixer without the mixing head cooler, the present embodiment can keep the temperature of the polymerization-reactive liquid foundation low, the polymerization-reactive liquid formulation being produced by mixing the first preparative liquid formulation with the second preparative liquid formulation, thereby further prolonging the pot life of the polymerization-reactive liquid formulation.

Thus, the rotary mixer 1 according to the present embodiment preferably includes the pipe coolers disposed in the first pipe 221 and the second pipe 231 as the cooler mechanisms for the first and second preparative liquid formulations, and the mixing head cooler disposed in the block 24 separately, or an appropriate combination thereof. Preferably, the liquid formulations are cooled with the pipe coolers and the mixing head cooler such that a difference ($\Delta T_1 = T_{1in} - T_{out}$) and a difference ($\Delta T_2 = T_{2in} - T_{out}$) are controlled to 5 to 10° C., where the difference ($\Delta T_1$) represents the difference between the temperature ($T_{1in}$) of the first preparative liquid formulation at the outlet of the feed pump of the first injector 22 and the temperature ($T_{out}$) of the liquid formulation in the ejection port 44 and the difference ($\Delta T_2$) represents the difference between the temperature ($T_{2in}$) of the second preparative liquid formulation at the outlet of the feed pump of the second injector 23 and the temperature ($T_{out}$) of the liquid formulation in the ejection port 44. By cooling to control the differences $\Delta T_1$ and $\Delta T_2$ to the above range, the pot life of the polymerization-reactive liquid formulation can be 30 to 60 minutes longer than that in the case where the polymerization-reactive liquid formulation is produced at room temperature without cooling. This results in improved formation stability of the polymerization-reactive liquid formulation.

Although one of possible methods of prolonging the pot life of the polymerization-reactive liquid formulation can be a method of adding a polymerization retardant to the first and second preparative liquid formulations, the present embodiment can prolong the pot life of the polymerization-reactive liquid formulation by cooling the first and second preparative liquid formulations even without adding the polymerization retardant to the first and second preparative liquid formulations. In other words, the present embodiment can prolong the pot life of the polymerization-reactive liquid formulation while avoiding a change in physical properties of the cured product caused by adding the polymerization retardant.

Next, the first preparative liquid formulation containing a norbornene-based monomer used in the present embodiment will be described. The norbornene-based monomer indicates cyclic olefin monomers having a norbornene ring structure in the molecule, and is not particularly limited. Among these, preferred is use of a polycyclic norbornene-based monomer having two or more rings because it provides a molded body having high heat resistance.

Examples of the norbornene-based monomer include bicyclic compounds such as norbornene and norbonadiene; tricyclic compounds such as dicyclopentadiene (cyclopentadiene dimers) and dihydrodicyclopentadiene; tetracyclic compounds such as tetracyclododecene; pentacyclic compounds such as cyclopentadiene trimers; heptacyclic compounds such as cyclopentadiene tetramers; and the like.

These norbornene-based monomers may have a substituent such as an alkyl group having 1 to 3 carbon atoms such as a methyl group, an ethyl group, a propyl group, or a butyl group; an alkenyl group having 2 to 8 carbon atoms such as a vinyl group; an alkenylidene group having 2 to 8 carbon atoms such as an ethylidene group; an aryl group having 6 to 10 carbon atoms such as a phenyl group, a tolyl group, or a naphthyl group; or the like. These norbornene-based monomers may also have a polar group such as a group containing an ester bond [—C(=O)O—], a group containing an ether bond (—O—), a cyano group, or a halogen atom.

Specific examples of the norbornene-based monomers include norbornene, dicyclopentadiene, tetracycladodecene, tricyclopentadiene, cyclopentadiene-methylcycicpentadiene codimers, 5-ethylidenenorbornene, 5-cyclohexenylnorbornene, 1,4,5,8-dimethano-1,4,4a,5,6,7,3,8a-octahydronaphthalene, 1,4-methano-1,4,4a,5,6,7,8,8a-octahydronapthalene, 6-ethylidene-1,4,5,8-dimethano-1,4,4a,5,6,7,8,8a-octahydronaphthalene, 6-ethylidene-1,4-methano-1,4,4a,5,6,7,8,8a-octahydronaphthalene, 1,4,5,8-dimethano-1,4,4a,5,6,7,8,8a-hexahydronaphthalene, ethylenebis(5-norbornane), and the like.

These norbornene-based monomers may be used alone or in combination.

Among these norbornene-based monomers, preferred are bi-, tri-, tetra-, and pentacyclic norbornene-based monomers because these are highly available, have high reactivity, and provide a molded body having high heat resistance.

Preferably, the resulting polymer is heat-curable. For this, the norbornene-based monomer to be used contains at least a cross-linkable monomer having two or more reactive double bends, such as a symmetric cyclopentadiene trimer. Preferably, the content of the cross-linkable monomer in the entire norbornene-based monomer is usually 2 to 30% by weight.

A monocyclic olefin monomer copolymerizable with the norbornene-based monomer, such as cyclobutene, cyclopentene, cyclopentadiene, cyclooctene, or cyclododecene, may be used as a comonomer in the range not in-pairing the object of the present invention.

The second preparative liquid formulation containing a metathesis polymerization catalyst used in the present embodiment new will be described. The metathesis polymerization catalyst is a complex containing a transition metal atom as a central atom to which a plurality of ions, atoms, polyatomic ions, and/or compounds are bonded. As the transition metal atom, atoms of Groups 5, 6, and 3 (Long Periodic Table, hereinafter the same) are used. Although there is no particular limitation to the atoms of the respective groups, examples of the atoms of Group 5 include tantalum, and those of the atoms of Group 6 include molybdenum and tungsten, and those of the atoms of Group 8 include ruthenium and osmium. Among these transition metal atoms, ruthenium and osmium of Group 8 are preferred. Namely, the metathesis polymerization catalyst used in the present invention is preferably a complex containing ruthenium or osmium as the central atom, more preferably a complex containing ruthenium as the central atom. A preferred complex containing ruthenium as the central atom is a ruthenium carbene complex in which a carbene compound is coordinated with ruthenium. Here, the "carbene compound" is a generic name for a compound having a methylene free radical, and refers to a compound having an uncharged divalent carbon atom (carbene carbon) represented by (>C:). The ruthenium carbene complex has high catalytic activity during bulk ring-opening polymerization, and thus a resulting polymer has reduced odor derived from unreacted monomers, leading to efficient production of a polymer of good quality. In addition, the ruthenium carbene complex is relatively stable against oxygen and water in the air and hardly deactivated, and thus it can be used in the atmosphere.

Examples of the ruthenium carbene complex include those represented by the following general formula (1) or (2).

[Chem 1]

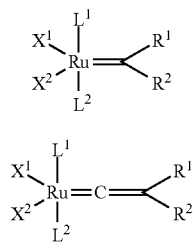

In the general formulas (1) and (2) above, $R^1$ and $R^2$ are independently a hydrogen atom, a halogen atom, or an organic group having 1 to 20 cartoon atoms which may contain a halogen atom, an oxygen atom, a nitrogen atom, a sulfur atom, a phosphorus atom, or a silicon atom; these groups nay be substituted or not substituted, or may be bonded to each other to form a ring. Examples of $R^1$ and $R^2$ bonded to each other to form a ring include an indenylidene group which may have a substituent, such as a phenyl indenylidene group.

Specific examples of the organic group having 1 to 20 carbon atoms which nay contain a halogen atom, an oxygen atom, a nitrogen atom, a sulfur atom, a phosphorus atom, or a silicon atom include an alkyl group having 1 to 20 carbon atoms, an alkenyl group having 2 to 20 carbon atoms, an alkynyl group having 2 to 20 carbon atoms, an aryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, an alkylthio group having 1 to 8 carbon atoms, a carbonyloxy group, an alkoxycarbonyl group having 1 to 20 carbon atoms, an alkylsulfonyl group having 1 to 20 carbon atoms, an alkylsufinyl group having 1 to 20 carbon atoms, an alkylsulfonic acid group having 1 to 20 carbon atoms, an arylsulfonic acid group having 6 to 20 carbon atoms, a phosphonic acid group, an arylphosphonic acid group having 6 to 20 carbon atoms, an alkylammonium group having 1 to 20 carbon atoms, an arylammonium group having 6 to 20 carbon atoms, and the like. These organic groups having 1 to 20 carbon atoms which may contain a halogen atom, an oxygen atom, a nitrogen atom, a sulfur atom, a phosphorus atom, or a silicon atom may be substituted or not substituted. Examples of the substituent include an alkyl group having 1 to 10 carbon atoms, an alkoxy group having 1 to 10 carbon atoms, and an aryl group having 6 to 10 carbon atoms, and the like.

$X^1$ and $X^2$ each independently represent any anionic ligand. The anionic ligand is a ligand having a negative charge when separated from a central metal atom, and examples thereof include a halogen atom, a diketonate group, a substituted cyclopentadienyl group, an alkoxyl group, an aryloxy group, a carboxyl group, and the like.

$L^1$ and $L^2$ present a heteroatom-containing carbene compound or a neutral electron-donating compound other than heteroatom-containing carbene compounds. The heteroatom-containing carbene compound and the neutral electron-donating compound other than heteroatom-containing carbene compounds are compounds having a neutral charge when separated from a central metal atom. From the viewpoint of improving catalytic activity, a heteroatom-containing carbene compound is preferred. The heteroatom means atoms of Groups 15 and 16 of the Periodic Table, and specifically, examples thereof include a nitrogen atom, an oxygen atom, a phosphorus atom, a sulfur atom, an arsenic atom, a selenium atom, and the like. Among these, from the viewpoint of obtaining a stable carbene compound, a nitrogen atom, an oxygen atom, a phosphorus atom, and a sulfur atom are preferred, and a nitrogen atom is particularly preferred.

As the heteroatom-containing carbene compound, a compound represented by the following general formula (3) or (4) is preferred, and from the viewpoint of improving catalytic activity, a compound represented by the following general formula (3) is particularly preferred.

[Chem 2]

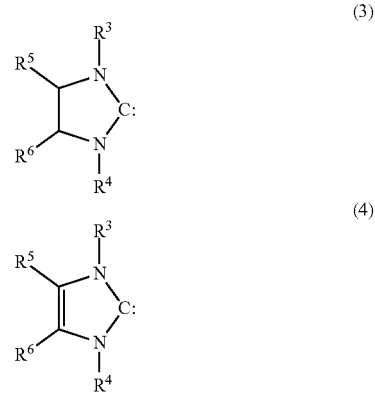

In the general formulas (3) and (4) above, $R^3$, $R^4$, $R^3$, and $R^6$ each independently represent a hydrogen atom, a halogen atom, or an organic group having 1 to 20 carbon atoms which may contain a halogen atom, an oxygen atom, a nitrogen atom, a sulfur atom, a phosphorus atom, or a silicon atom. Specific examples of the organic group having 1 to 20 carbon atoms which may contain a halogen atom, an oxygen atom, a nitrogen atom, a sulfur atom, a phosphorus atom, or a silicon atom are the same as those of the general formulas (1) and (2) above.

$R^3$, $R^4$, $R^5$, and $R^6$ may also be bonded to each other in any combination to form a ring.

Since the effect of the present invention becomes more prominent, it is preferable that $R^5$ and $R^6$ be hydrogen atoms. $R^3$ and $R^4$ are preferably an aryl group which may be substituted or not substituted, more preferably a phenyl group having an alkyl group having 1 to 10 carbon atoms as a substituent, particularly preferably a mesityl group.

Examples of the neutral electron-donating compound include an oxygen atom, water, carbonyls, ethers, nitriles, esters, phosphines, phosphinites, phosphites, sulfoxides, thioethers, amides, imines, arena tics, cyclic diolefins, olefins, isocyanides, thiocyanates, and the like.

In the general formulas (1) and (2), $R^1$, $R^2$, $X^1$, $X^2$, $L^1$, and $L^2$ may stand alone and/or be bonded to each other in any combination to form a muitidentate chelating ligand.

Further, anting the compounds represented by the above general formula (1) or (2), the ruthenium carbene complex used in the present invention is preferably a compound represented by the above general formula (1) from the viewpoint of improving heat resistance and insulating primer ties of the norbornene-based cross-linked polymer according to the preset invention in a balanced way, and especially, a compound represented by the following general formula (5) or (6) is more preferred. It is presumed that by using such a compound as the metathesis polymerization catalyst, the polymerization reaction is allowed to moderately proceed and generation of gas bubbles is suppressed, leading to the norbornene-based cross-linked polymer according to the present invention having heat resistance and insulating properties improved in a balanced way.

The general formula (5) is shown below.

[Chem 3]

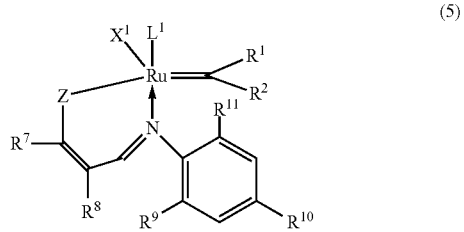

(5)

In the general formula (5), Z is an oxygen atom, a sulfur atom, a selenium atom, $NR^{12}$, $PR^{12}$, or $AsR^{12}$, and $R^{12}$ is a hydrogen atom, a halogen atom, or an organic group having 1 to 20 carbon atoms which may contain a halogen atom, an oxygen atom, a nitrogen atom, a sulfur atom, a phosphorus atom, or a silicon atom; however, as Z, an oxygen atom is preferred because the effect of the present invention becomes more pronounced.

$R^1$, $R^2$, $X^1$, and $L^1$ are the same as those in the general formulas (1) and (2), and may stand alone and/or be bonded to each other in any combination to form a multidentate chelating ligand. However, it is preferable that $X^1$ and $L^1$ do not form a multidentate chelating ligand and that $R^1$ and $R^2$ be bonded to each other to form a ring, which is more preferably an indenylidene group which may be substituted or not substituted, particularly preferably a phenylindenylidene group.

Further, specific examples of the organic group having 1 to 20 carton atoms which nay contain a halogen atom, an oxygen atom, a nitrogen at on, a sulfur atom, a phosphorus atom, or a silicon atom are the same as those of the general formulas (1) and (2) above.

In the above general formula (5), $R^7$ and $R^8$ each independently represent a hydrogen atom, an alkyl group having 1 to 20 carbon atoms, an alkenyl group having 2 to 20 carbon atoms, or a heteroaryl group having 6 to 20 carbon atoms, and these groups may be substituted or not substituted, or may foe bonded to each other to form a ring. Examples of the substituent may include an alkyl group having 1 to 10 carbon atoms, an alkoxy group having 1 to 10 carbon atoms, or an aryl group having 6 to 10 carbon atoms. In the case where $R^7$ and $R^8$ form a ring, the ring may be any of an aromatic ring, an alicyclic ring, and a heterocyclic ring, but it is preferable to form an aromatic ring, it is more preferable to form an aromatic ring having 6 to 20 carbon atoms, and it is particularly preferable to form an aromatic ring having 6 to 10 carton atoms.

In the above general formula (5), $R^9$, $R^{10}$, and $R^{11}$ each independently represent a hydrogen at an, a halogen atom, or an organic group having 1 to 20 carbon atoms which may contain a halogen atom, an oxygen atom, a nitrogen atom, a sulfur atom, a phosphorus atom, or a silicon atom; these groups may be substituted or not substituted, or may be bonded to each other to form a ring. Specific examples of the organic group having 1 to 20 carbon atoms which may contain a halogen atom, an oxygen atom, a nitrogen atom, a sulfur atom, a phosphorus atom, or a silicon atom are the same as those of the general formulas (1) and (2) above.

$R^9$, $R^{10}$, and $R^{11}$ are preferably a hydrogen atom or an alkyl group having 1 to 20 carbon atoms, particularly preferably a hydrogen atom or an alkyl group having 1 to 3 carbon atoms.

Specific examples of the compound represented by the above general formula (5) and a method for producing the same include those described in International Publication No. 03/062253 (JP-A-2005-515260) and the like, for example. The catalyst deactivation temperature of the compound is usually 230° C. or lower.

The general formula (6) is shown below.

[Chem 4]

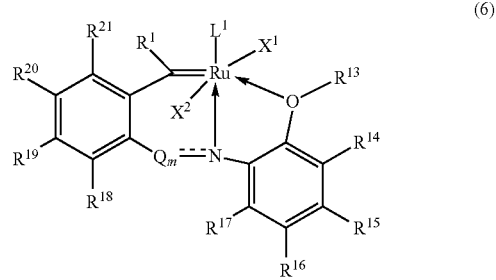

(6)

In the above general formula (6), "m" is 0 or 1. "m" is preferably 1, where "Q" is an oxygen atom, a nitrogen atom, a sulfur atom, a methylene group, an ethylene group, or a carbonyl group, preferably a methylene group.

[Chem 5]

----- is a single bond or a double bond, and is preferably a single bond.

$R^1$, $X^1$, $X^2$, and $L^1$ are the same as those in the general formulas (1) and (2), and may stand alone and/or be bonded to each other in any combination to form a multidentate chelating ligand. However, it is preferable that $X^1$, $X^2$, and $L^1$ do not form a multidentate chelating ligand and $R^1$ be a hydrogen atom.

$R^{13}$ to $R^{21}$ each independently represent a hydrogen atom, a halogen atom, or an organic group having 1 to 20 carbon atoms which may contain a halogen atom, an oxygen atom, a nitrogen atom, a sulfur atom, a phosphorus atom, or a silicon atom; these groups may be substituted or not substituted, or may be bonded to each other to form a ring. Specific examples of the organic group having 1 to 20 carbon atoms which ray contain a halogen atom, an oxygen atom, a nitrogen atom, a sulfur atom, a phosphorus atom, or a silicon atom are the same as those of the general formulas (1) and (2) above.

$R^{13}$ is preferably an alkyl group having 1 to 20 carbon atoms, more preferably an alkyl group having 1 to 3 carbon atoms, $R^{14}$ to $R^{17}$ are preferably a hydrogen atom, and $R^{18}$ to $R^{21}$ are preferably a hydrogen atom or a halogen atom.

Specific examples of the compound represented by the above general formula (6) and a method for producing the same include those described in International Publication No. 11/079799 (JP-A-2013-516392), and the like, for example. A catalyst deactivation temperature of the compound is usually 230° C. or lower.

The amount of the metathesis polymerization catalyst to be used is preferably 0.01 mmol or more, more preferably 0.1 to 50 mmol, still more preferably 0.1 to 20 mmol relative to 1 mol of the monomer components containing the norbornene-based monomer.

The second preparative liquid formulation can be prepared, for example, by dissolving or dispersing the metathesis polymerization catalyst in a small amount of an appropriate solvent. Examples of such a solvent include aromatic hydrocarbons such as toluene, xylene, ethyl benzene, and trimethyl benzene; ketones such as methyl ethyl ketone, cyclopentanone, cyclohexanone, 2-heptanone, and 4-hydroxy-4-methyl-2-pentanone; and the like.

The first preparative liquid formulation and the second preparative liquid formulation each nay contain a component other than the norbornene-based monomer and the metathesis polymerization catalyst, and examples of such a component include an activator, a polymerization retardant, a filler, a radical generator, a modifier, an antioxidant, a colorant, a photostabilizer, a flame retardant, and the like.

The activator is a compound which acts as a cocatalyst of the metathesis polymerization catalyst described above and improves the polymerization activity of the metathesis polymerization catalyst described above. Although not particularly limited, specific examples of such an activator include organoaluminum compounds such as alkylaluminum halides such as ethylaluminum dichloride and diethylaluminum chloride, and alkoxyalkylaluminum halides; organotin compounds such as tetrabutyltin; organozinc compounds such as diethylzinc; chlorosilane compounds such as dimethylmonochlorosilane, dimethyldichlorosilane, diphenyldichlorosilane, tetrachlorosilane, bicycloheptenylmethyldichlorosilane, phenylmethyldichlorosilane, dihexyldichlorosilane, phenyltrichlorosilane, and methyltrichlorosilane; and the like.

Although not particularly limited, the amount of the activator to be used is preferably 0.1 mol or more, mere preferably 1 mol or litre relative to 1 mol of the metathesis polymerization catalyst, and the upper limit of the amount to be used is preferably 100 mol or less, more preferably 20 mol or less. The use of a significantly small amount of the activator results in significantly low polymerization activity to increase the reaction time, thus reducing production efficiency. In contrast, the use of a significantly large amount of the activator results in an excessively active reaction, thus making it more unlikely to obtain a desired polymer.

The polymerization retardant is a component for suppressing initiation of polymerization while the monomer components and the metathesis polymerization catalyst are mixed to prepare a formulation. Examples of the polymerization retardant include phosphines, phosphites, vinyl ether derivatives, ethers, esters, nitrile compounds, pyridine derivatives, alcohols, acetylenes, α-olefins, and the like.

Although not particularly limited, the amount of the polymerization retardant to be used is preferably 15 parts by mass or more and 5000 parts by mass or less, more preferably 15 to 1800 parts by mass, more preferably 50 to 900 parts by mass, still more preferably 150 to 500 parts by mass relative to 100 parts by mass of the metathesis polymerization catalyst.

Although not particularly limited, examples of the filler include a fibrous filler having an aspect ratio of 5 to 100 and a particulate filler having an aspect ratio of 1 to 2. The fibrous filler and the particulate filler may be used in combination.

Specific examples of the fibrous filler include carbon fibers, glass fibers, wollastonite, potassium titanate, Zonolite, basic magnesium sulfate, aluminum borate, tetrapod-type zinc oxide, gypsum fibers, phosphate fibers, alumina fibers, needle-like calcium carbonate, needle-like boehmite, and the like. Among these, wollastonite is preferred from the viewpoint of enhancing rigidity using a small amount thereof and not inhibiting the bulk ring-opening polymerization reaction.

Specific examples of the particulate filler include calcium carbonate, calcium hydroxide, calcium silicate, calcium sulfate, aluminum hydroxide, magnesium hydroxide, titanium oxide, zinc oxide, barium titanate, silica, alumina, carbon black, graphite, antimony oxide, red phosphorus, a variety of metal powders, clay, a variety of ferrites, hydrotalcite, and the like. Among these, silica, alumina, and aluminum hydroxide are preferred because they do not inhibit the bulk ring-opening polymerization reaction. In addition, a hollow particle may be used as the filler. Although not particularly limited, the hollow particle may be a hollow inorganic microsphere, or may be a hollow organic microsphere, or may be a hollow organic-inorganic composite microsphere. Examples of the hollow inorganic microsphere include hollow balloons made of glass such as a hollow glass balloon, hollow balloons trade of silica, hollow balloons made of a metal compound such as a hollow alumina balloon, hollow balloons made of porcelain such as a hollow ceramic balloon, and the like. Examples of the hollow organic microsphere include resin hollow balloons such as a hollow acrylic balloon, a hollow vinylidene chloride balloon, a phenol balloon, and an epoxy balloon, and the like.

The filler preferably has a surface subjected to a hydrophobization treatment. By using such a hydrophobized filler, aggregation and sedimentation of the filler in the formulation can be prevented, and the filler can be homogeneously dispersed in the resulting polymer. Examples of the treatment agent used in the hydrophobization treatment include silane coupling agents such as vinyltrimethoxysilane, titanate coupling agents, aluminate coupling agents, fatty acids such as stearic acid, oils and fats, surfactants, waxes, and the like. The hydrophobization treatment of the filler can be performed by mixing the treatment agent and the filler simultaneously in the process of preparing the formulation.

The compounding amount of the filler is preferably 10 to 1000 parts by ness, more preferably 100 to 500 parts by mass relative to 100 parts by mass of the monomer components containing the norbornene-based monomer. The compounding amount of the filler controlled within this range results in a polymer having enhanced strength.

Examples of the radical generator include known organic peroxides, diazo compounds, nonpolar radical generators, and the like. Among these, organic peroxides are preferred.

Examples of such organic peroxides include hydroperoxides such as t-butyl hydroperoxide and cumene hydroperoxide; dialkyl peroxides such as di-t-butyl peroxide, 2,5-dimethyl-2,5-di(t-butylperoxy)-3-hexine, and 2,5-dimethyl-2,5-di(t-butylperoxy)hexane; and the like. Dialkyl peroxides are preferred in terms of small obstacles to the metathesis polymerization reaction.

The compounding amount of the radical generator is usually 0.5 to 2.0 parts by mass relative to 100 parts by mass of the monomer components attaining the norbornene-based monomer.

The components such as a modifier are also known, and a desired amount of those can be appropriately compounded to be used.

In the present embodiment, such a first preparative liquid formulation and such a second preparative liquid formulation are fed from the mixer body 2 to the mixing head 3, and are mixed by the mixing head 3 to prepare the polymerization-reactive liquid formulation. For example, the polymerization-reactive liquid formulation can be fed to the molding target such as an electrical part, and polymerized on the surface of the molding target to obtain a polymer, thus forming a sealing film or a heat dissipation film formed of such a polymer on the surface of a molding target such as an electrical part. At this time, heat can be applied as required in order for the polymerization reaction to proceed.

Alternatively, the polymerization-reactive liquid formulation mixed in the mixing head 3 can be fed to a mold to form a polymer product having a film form, a column shape, or any other three-dimensional shape, for example. In this case, the polymerization-reactive liquid formulation is heated in the mold to effect the polymerization reaction, resulting in a polymer product having a shape corresponding to the mold.

Although not particularly limited, as the mold used, a mold laving a split, mold structure including a male mold and a female mold is usually preferred. The mold used does not need to be an expensive mold having high rigidity, and a resin mold or the like can be used. Although the material for the mold is not particularly limited, examples thereof include steel, aluminum, zinc alloys, nickel, copper, chromium, and the like. The mold may be produced by any method of casting, forging, thermal spraying, electrocasting, or the like, and may be plated.

The mold temperature is preferably 10 to 150° C., more preferably 30 to 120° C., still more preferably 50 to 100° C. The clamping pressure is usually in the range of 0.01 to 10 MPa. The polymerization reaction time can be appropriately selected, but is usually 1 second to 20 minutes, preferably 10 seconds to 5 minutes after the end of the injection of the polymerization-reactive liquid formulation.

After the end of polymerisation reaction, the mold can be opened, and be removed to obtain the polymer.

In the above-described embodiment, the first preparative liquid formulation used contains the norbornene-based monomer, and the second preparative liquid formulation used contains the metathesis polymerization catalyst. In the above-described embodiment, the case where the metathesis polymerization catalyst to be used does not require the activator (cocatalyst) is illustrated.

On the other hand, in the case where the metathesis polymerization catalyst to be used requires the activator, the first preparative liquid formulation may contain the norbornene-based monomer and the activator, and the second preparative liquid formulation may contain the norbornene-based monomer and the metathesis polymerization catalyst.

Figure 6:
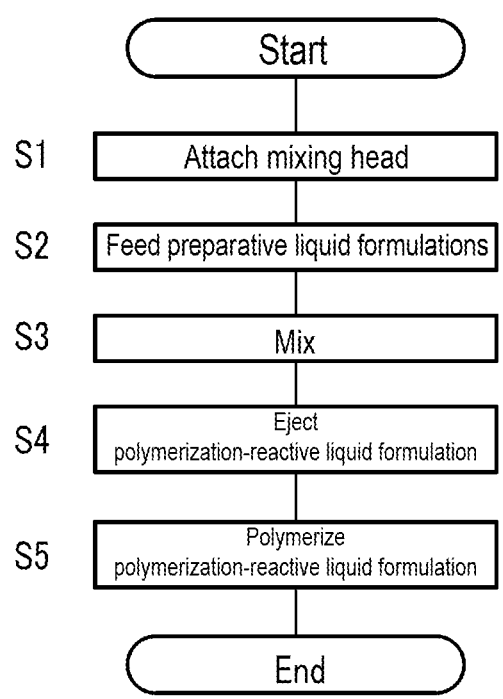
FIG. 6 is a flowchart shewing a procedure of producing the polymerization-reactive liquid formulation by the rotary mixer shown in FIG. 1.

The effects of the above-described embodiment now will be described. As shown in the flow chart in FIG. 6, the mixing head 3 is attached to the mixer body 2 (step S1). By attaching the mixing head 3 to the mixer body 2, the motor 21 of the mixer body 2 is connected to the mixing rotor 6 with a connection shaft not shown.

The mixer body 2 feeds the preparative liquid formulations to the mixing head 3 (step S2). Specifically, the first injector 22 of the mixer body 2 feeds a predetermined amount of the first preparative liquid formulation containing the norbornene-based monomer to the mixing chamber 41 via the first pipe 221 and the first chemical solution feeding port 74 of the mixing head 3 by a feed pump having a measuring function. The second injector 23 feeds a predetermined amount of the second preparative liquid formulation containing the metathesis polymerization catalyst to the mixing chamber 41 via the second pipe 231 and the second chemical solution feeding port 75. At this time, the first and the second preparative liquid formulations can be fed to the mixing chamber 41 while being cooled by the pipe coolers and the mixing head cooler.

In the case where the first preparative liquid formulation does not contain the filler, the ratio (mass ratio) of the flow rate of the first preparative liquid formulation to that of the second preparative liquid formulation is 100:3.5, for example. Thus, in the reaction injection molding using an Ru catalyst, the monomer liquid is fed at a flow rate predominantly larger than that of the catalyst liquid.

Figure 7:
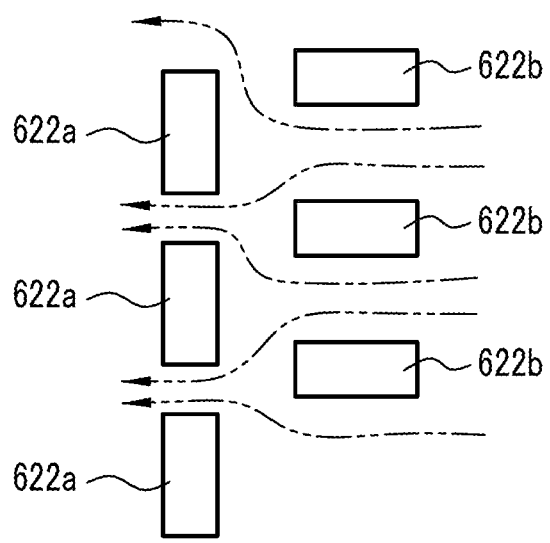
FIG. 7 is a diagram illustrating the flow of a first preparative liquid formulation and the like caused by the mixing rotor shown in FIG. 5.

The mixer body 2 drives the motor 21 to rotate the mixing rotor 6, mixing the first preparative liquid formulation and the second preparative liquid formulation in the mixing chamber 41 (step S3). The rotation of the mixing rotor 6 causes the first protrusions 622a and the second protrusions 622b to push the first preparative liquid formulation and the second preparative liquid formulation, generating flows in a horizontal direction in the mixing chamber 41. At this time, as shown by two-dot chain lines in FIG. 7, the first preparative liquid formulation and the second preparative liquid formulation pass through gaps between the first protrusions 622a and the second protrusions 622b as a flow path, and repeatedly split and merge. In particular, the mixing rotor 6 according to the present embodiment is configured such that the first and second protrusion rows 623a and 623b are alternately arranged in the circumferential direction, the first protrusion rows 623a being formed of the first protrusions 622a, the second protrusion rows 623b being formed of the second protrusions 622b, and the first protrusions 622a are positioned offset between the first protrusion rows 623a, and the second protrusions 622b are positioned offset between the second protrusion rows 623b. Accordingly, the first preparative liquid formulation and the second preparative liquid formulation flow through a complex flow path. This allows the first preparative liquid formulation and the second preparative liquid formulation to be homogeneously mixed despite feeding the first preparative liquid formulation at a predominantly larger flow rate.

The polymerization-reactive liquid formulation produced by mixing in the mixing chamber 41 of the casing 4 moves downward along the gaps between the first protrusions 622a and the second protrusions 622b, passes through the opening 55 of the searing member 5 arranged at the lower end of the mixing chamber 41, passes through the ejection path 43, and is ejected from the ejection port 44 of the ejection nozzle 42 (step S4). The polymerization-reactive liquid formulation ejected is fed to an electrical part or an electronic part arranged below the mixing head 3 and used as a sealing material, a heat dissipating material, or the like. In the case where an attachment such as an injection needle or a brush is attached at the mount 42a at the tip of the ejection nozzle 42, the polymerization-reactive liquid formulation is fed to the electrical part or the like via the attachment. In the next step S5, the polymerization reaction of the polymerization-reactive liquid formulation fed to the electrical part or the electronic part proceeds, solidifying the polymerization-reactive liquid formulation.

In the step S2 described above, in the case where the first preparative liquid formulation contains the filler, the ratio of the flow rate of the first preparative liquid formulation to that of the second preparative liquid formulation is 100:0.5, for example. In the step S3, the first preparative liquid formulation containing the filler and the second preparative liquid formulation are mixed. However, the mixing head 3 according to the present embodiment is configured such that the interval CL1 between the inner circumferential surface of the mixing chamber 41 and the first and second protrusions 622a and 622b is preferably 0.1 to 1 mm, more preferably 0.2 to 0.3 urn, and thus even the preparative liquid formulation containing the filler can be homogeneously mixed.

As described above, according to the present embodiment, the mixing head 3 used in the step of mixing the first preparative liquid formulation with the second preparative liquid formulation includes the mixing rotor 6 including the plurality of protrusions 622 disposed on the circumferential surface thereof, wherein the plurality of protrusions 622 is configured with the first protrusions 622a having a width in the axial direction of the rotor body 61 larger than that in the circumferential direction thereof, and the second protrusions 622b having a width in the axial direction of the rotor body 61 smaller than that in the circumferential direction thereof, and the first and second protrusion rows 623a and 623b are alternately arranged at a predetermined interval in the circumferential direction of the rotor body 61, the first protrusion rows 623a being formed of the first protrusions 622a aligned at a predetermined interval in the axial direction of the rotor body 61, the second protrusion rows 623b being formed of the second protrusions 622b aligned at a predetermined interval in the axial direction of the rotor body 61.

Thereby, the rotation of the mixing rotor 6 causes the first protrusions 622a and the second protrusions 622b to push the first preparative liquid formulation and the second preparative liquid formulation, thus generating flows in a horizontal direction in the mixing chamber 41. At this time, the first preparative liquid formulation and the second preparative liquid formulation pass through the gaps between the first protrusions 622a and the second protrusions 622b as a flow path, and repeatedly split and merge. In particular, the first and second protrusion rows 623a and 623b formed of the first protrusions 622a and formed of the second protrusions 622b, respectively, are alternately arranged in the circumferential direction, and thus the first preparative liquid formulation and the second preparative liquid formulation flow through a complex flow path. This allows the first preparative liquid formulation and the second preparative liquid formulation to be homogeneously mixed despite feeding the first preparative liquid formulation at a predominantly larger flow rate.

According to the present embodiment, the first protrusion rows 623a are arranged such that the first protrusions 622a in each first protrusion row 623a are positioned offset in the axial direction from the first protrusions 622a in a first protrusion row 623a adjacent to the first protrusion row with a second protrusion row 623b interposed therebetween. The second protrusion rows 623b are arranged such that the second protrusions 622b in each second protrusion row 623b are positioned offset in the axial direction from the second protrusions 622b in a second protrusion row 623b adjacent to the second protrusion row with a first protrusion row 623a interposed therebetween. Thereby, the first preparative liquid formulation and the second preparative liquid formulation flow through an even more complex flow path, allowing the first preparative liquid formulation and the second preparative liquid formulation to be homogeneously mixed despite feeding the first preparative liquid formulation at a predominantly larger flow rate.

According to the present embodiment, the mixing head 3 is formed as a unit detachably attachable to the mixer body 2 of the rotary mixer 1, and thus, in the case where the polymerization-reactive liquid formulation adhering to the inside of the mixing head 3 is solidified, the mixing head 3 can be replaced with a new mixing head 3.

According to the present embodiment, the first and second protrusion rows 623a and 623b are alternately arranged in positions on the circumferential surface of the rotor body 61 divided to 6 to 18 even-numbered regions in the circumferential direction. Accordingly, the arrangement of the protrusions of the mixing rotor 6 can be optimized depending on types of the first preparative liquid formulation and the second preparative liquid formulation, and the like.

According to the present embodiment, the interval between the inner circumferential surface of the mixing chamber 41 and the circumferential surface of the mixing rotor 6 including the protrusions 622 is preferably 1 to 7 mm, more preferably 1.5 to 7 nm, still more preferably 2 to 5 mm, the interval between the inner circumferential surface of the mixing chamber 41 and the first and second protrusions 622a and 622b is preferably 0.1 to 1 mm, mare preferably 0.2 to 0.8 mm. Thus, the preparative liquid formulation containing the filler can be appropriately mixed.

According to the present embodiment, the ejection nozzle 42 of the casing 4 includes a mount 42a to which an attachment for charging or applying the polymerization-reactive liquid formulation to the molding target is attached, and thus the polymerization-reactive liquid formulation can be charged or applied to a minute area or a wide area of the molding target.

According to the present embodiment, the first and the second preparative liquid formulations can be fed to the mixing chamber 41 while being cooled by the pipe coolers and the mixing head cooler so that the difference ($\Delta T_1$) between the temperature of the liquid formulation at the outlet of the feed pump of the first injector 22 and that of the liquid formulation at the ejection port 44 and the difference ($\Delta T_2$) between the temperature of the liquid formulation at the outlet of the feed pump of the second injector 23 and that of the liquid formulation at the ejection port 44 are 5 to 10° C. Thereby, the polymerization-reactive liquid formulation produced can be ejected from the ejection port while keeping the temperature of the liquid formulation low, extending the pot life of the liquid formulation compared to the case of without cooling.

In the above-described embodiment, an example has been described in which the mixing head 3 is substantially vertically installed such that the first chemical solution feeding port 74 and the second chemical solution feeding port 75 are arranged at the top and the ejection port 44 is arranged at the bottom, and the first preparative liquid formulation and the second preparative liquid formulation are fed from the first chemical solution feeding port 74 and the second chemical solution feeding port 75 at the top, and the polymerization-reactive liquid formulation mixed is ejected from the ejection port at the bottom. The invention is, however, not limited to such an arrangement configuration. For example, the mixing head 3 may be substantially vertically installed such that the first chemical solution feeding port 74 and the second chemical solution feeding port 75 are arranged at the bottom and the ejection port 44 is arranged at the top, and the first preparative liquid formulation and the second preparative liquid formulation are fed from the first chemical solution feeding port 74 and the second chemical solution feeding port 75 at the bottom, and the polymerization-reactive liquid formulation mixed is ejected from the ejection port 44 at the top. Further, the mixing head 3 may be arranged such that the axial center direction thereof is horizontal, so that the feeding of the first preparative liquid formulation and the second preparative liquid formulation and the ejection of the polymerization-reactive liquid formulation are carried out in a horizontal plane, or the mixing head 3 may be arranged to be tilted at a predetermined angle.

EXAMPLES

A liquid formulation containing dicyclopentadiene as a norbornene-based monomer was prepared as a first preparative liquid formulation. 0.6 Parts by mass of a ruthenium catalyst (VC843, molecular weight: 343, available from Strem Chemicals) represented by the following formula (7) as a metathesis polymerization catalyst and 15 parts by mass of 2,6-di-t-butyl-p-cresol (BHT, antioxidant) were dissolved in 82 parts by mass of cyclopentanone. In the next step, 2.2 parts try mass of 3,4-dimethylpyridine and 0.1 parts by mass of phenyltrichlorosilane were mixed, and the mixture was defined as a second preparative liquid formulation. 87 Parts by mass of alumna as a filler was mixed into 13 parts by mass of the first preparative liquid formulation, and the mixture was defined as a third preparative liquid formulation.

[Chem 6]

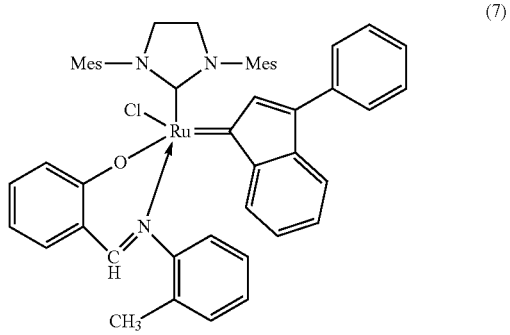

(7)

Example 1

Using a rotary mixer 1 shown in FIGS. 1 to 5, the first preparative liquid formulation and the second preparative liquid formulation prepared above were mixed by a mixing head 3 to obtain a polymerization-reactive liquid formulation. At this time, the temperature of the first preparative liquid formulation at the outlet of a first injector 22 was measured, and the temperature of the second preparative liquid formulation at the outlet of a second injector 23 was measured. At this time, the ratio (mass ratio) of the flow rate of the first preparative liquid formulation to that of the second preparative liquid formulation "flow rate of first preparative liquid formulation:flow rate of second preparative liquid formulation" was 100:3.5, the ejection amount was about 2 g, and the number of rotations of the mixer was 250 rpm. In the present Example, a mixing rotor 6 used had first, and second protrusion rows 623a and 623b alternately arranged in positions on the circumferential surface of the rotor body 61 divided to 12 regions in the circumferential direction. The inner volume of the mixing head 3 was 3.5 mL, the interval CL1 between the inner circumferential surface of a mixing chamber 41 and first and second protrusions 622a and 622b was 0.5 mm, and the interval CL2 between the inner circumferential surface of the mixing charter 41 and the circumferential surface of the mixing rotor 6 including the protrusions 622 (the circumferential surface of the mixing matter 62) was 3.5 mm. The color of the polymerization-reactive liquid formulation obtained was visually confirmed. The polymerization-reactive liquid formulation obtained was ejected into an SUS-made mold, and heated in an oven at 150° C. for 1 hour to obtain a cured product. When the polymerization-reactive liquid formulation obtained was ejected, about 2 g was ejected per ejection, and 10 ejections in total were performed. The ejection amount (g) of each ejection was measured, and the average value, the standard deviation, and the coefficient of variation (CV) (%) of the amount (g) of the 10 ejections were determined. The amount of unreacted components in the cured product was measured as a weight decrease ratio using a differential thermal/thermogravimetric apparatus (TC-DTA). The measurement temperature was elevated at a rate of 20° C./min, and the calculation was carried out in the range from 50° C. to 200° C. The glass transition temperature of the cured product was measured using a differential scanning calorimetric (DSC) apparatus in accordance with JIS K7121. The measurement temperature was elevated at a rate of 10° C./min. The mixed state and the ejection state were observed by the above-described method, finding that the polymerization-reactive liquid formulation obtained was an excellent mixture in which the first preparative liquid formulation and the second preparative liquid formulation were homogeneously mixed, and a polymer prepared using the polymerization-reactive liquid formulation also was homogeneous in whole [evaluation of the mixed ejection in Table 1: A (good)]. The variations of the ejection amount of the polymerization-reactive liquid formulation were small, which suggests that the ejection could be repeated at a high accuracy.

Example 2

The third preparative liquid formulation and the second preparative liquid formulation were injected into the mixer at a ratio of 100:0.4. The number of rotations of the mixing rotor was 800 rpm. A cured product was obtained and measured in the same manner as in Example 1.

Example 3

The rotary mixer 1 used included a first pipe cooler, a second pipe cooler, and a mixing head cooler. A polymerization-reactive liquid formulation was produced to obtain a cured product in the same manner as in Example 1 except that the first preparative liquid formulation was fed while being cooled by the first pipe cooler and the mixing head cooler, the second preparative liquid formulation was fed while being cooled by the second pipe cooler and the mixing head cooler, and the ejection amount was about 10 g. The obtained product was evaluated in the same manner as in Example 1. The temperature of the polymerization-reactive liquid formulation immediately after the ejection was measured, and the difference ($\Delta T_1$) from the temperature of the first preparative liquid formulation at the outlet of the first injector 22 and the difference ($\Delta T_2$) from the temperature of the second preparative liquid formulation at the outlet of the second injector 23 were determined. $\Delta T_1$ was 9.5° C., and ΔT₂ was 7.5° C. The pot life of the polymerization-reactive liquid formulation was 54 minutes longer than that of Example 1, the pot life being measured by monitoring the time taken for the viscosity of the polymerization-reactive liquid formulation obtained by mixing the first preparative liquid formulation and the second preparative liquid formulation to increase from the viscosity immediately after the ejection to 1000 Pa·s.

Comparative Example 1

A rotary mixer described in Japanese Unexamined Patent Application Publication No. 2019-150786 was used instead of the rotary mixer 1 shown in FIGS. 1 to 5. When a cured product was obtained and measured in the same manner as in Example 2, the drive rotor was broken, making mixing impossible and failing to obtain a cured product of the polymerization-reactive liquid formulation [evaluation of the mixed ejection in Table 1: F (failed)].

TABLE 1

| | Mixed ejection | Weight decrease ratio (%) | Glass transition tempreature (° C.) | Accuracy of repeated ejection | | |
|---|---|---|---|---|---|---|
| | | | | Average (g) | Standard deviation | CV (%) |
| Example 1 | A | 0.32 | 126 | 1.97 | 0.048 | 2.5 |
| Example 2 | A | 0.33 | 121 | 2.05 | 0.053 | 2.6 |
| Example 3 | A | 0.33 | 121 | 10.9 | 0.29 | 2.6 |
| Comparative Example 1 | F | — | — | — | — | — |

REFERENCE SIGNS LIST

1 . . . rotary mixer
2 . . . mixer body
21 . . . motor (driving source)
22 . . . first injector
221 . . . first pipe
23 . . . second injector
231 . . . second pipe
24 . . . block
3 . . . mixing head
4 . . . casing
41 . . . mixing chamber
42 . . . ejection nozzle
42a . . . mount
43 . . . ejection path
45 . . . flange
5 . . . bearing member
52 . . . bearing cavity
55 . . . opening
6 . . . mixing rotor
61 . . . rotor body
611 . . . support shaft
612 . . . keyway (connection)
62 . . . mixing member
622a . . . first protrusion
622b . . . second protrusion
623a . . . first protrusion row
623b . . . second protrusion row

The invention claimed is:

1. A method for producing a polymerization-reactive liquid formulation, comprising: a step of feeding a first preparative liquid formulation containing a norbornene-based monomer and a second preparative liquid formulation containing a metathesis polymerization catalyst to a mixing head of a rotary mixer; and a step of mixing the first preparative liquid formulation with the second preparative liquid formulation by the mixing head,
wherein the mixing head includes:
a casing including a cylindrical mixing chamber closed at one end and open at the other end, and an ejection port disposed at the closed end of the mixing chamber to eject the polymerization-reactive liquid formulation;
a cap attached to the open end of the mixing chamber to seal the mixing chamber, the cap including a first chemical solution feeding port which feeds the first preparative liquid formulation to the mixing chamber and a second chemical solution feeding port which feeds the second preparative liquid formulation to the mixing chamber;
a mixing rotor including a cylindrical rotor body which is accommodated inside the mixing chamber to be rotatable around the central axis of the mixing chamber and extends in the axial direction of the mixing chamber; a connection disposed at one end of the rotor body to be connected to a driving source for the rotary mixer through a connection hole disposed in the cap; and a plurality of protrusions disposed on the circumferential surface of the rotor body to mix the first preparative liquid formulation with the second preparative liquid formulation by rotation of the rotor body; and
a bearing member attached to the closed end of the mixing chamber to rotatably support the other end of the rotor body,
the plurality of protrusions includes first protrusions and second protrusions, the first protrusions having a width in the axial direction of the rotor body larger than that in the circumferential direction thereof, the second protrusions having a width in the axial direction of the rotor body smaller than that in the circumferential direction thereof, and
first and second protrusion rows are alternately arranged at a predetermined interval in the circumferential direction of the rotor body, the first protrusion rows being formed of the first protrusions aligned at a predetermined interval in the axial direction of the rotor body, the second protrusion rows being formed of the second protrusions aligned at a predetermined interval in the axial direction of the rotor body.

2. The method for producing a polymerization-reactive liquid formulation according to claim 1,
wherein the first protrusion rows are arranged such that the first protrusions in each first protrusion row are positioned offset in the axial direction from the first protrusions in a first protrusion row adjacent to the first protrusion row with a second protrusion row interposed therebetween.

3. The method for producing a polymerization-reactive liquid formulation according to claim 1,
wherein the second protrusion rows are arranged such that the second protrusions in each second protrusion row are positioned offset in the axial direction from the second protrusions in a second protrusion row adjacent to the second protrusion row with a first protrusion row interposed therebetween.

4. The method for producing a polymerization-reactive liquid formulation according to claim 1, wherein the mixing head is formed as a unit to be detachably attachable to the body of the rotary mixer.

5. The method for producing a polymerization-reactive liquid formulation according to claim 1,
wherein the first and second protrusion rows are alternately arranged in positions on the circumferential surface of the rotor body divided to 6 to 18 even-numbered regions in the circumferential direction.

6. The method for producing a polymerization-reactive liquid formulation according to claim 1,
wherein the mixing head has an inner volume of 1 to 20 mL, the inner volume being defined by the inner circumferential surface of the mixing chamber, the inner surface of the cap, and the outer circumferential surface of the mixing rotor.

7. The method for producing a polymerization-reactive liquid formulation according to claim 1,
wherein an interval between the inner circumferential surface of the mixing chamber and the circumferential surface of the mixing rotor including the protrusions is 1 to 7 mm, and an interval between the inner circumferential surface of the mixing chamber and the first and second protrusions is 0.1 to 1 mm.

8. The method for producing a polymerization-reactive liquid formulation according to claim 1,
wherein the ratio of the flow rate of the first preparative liquid formulation to that of the second preparative liquid formulation is 100:100 to 100:0.2.

9. The method for producing a polymerization-reactive liquid formulation according to claim 8,
wherein the ratio of the flow rates is 100:3.5 to 100:0.4.

10. The method for producing a polymerization-reactive liquid formulation according to claim 1,
wherein the first preparative liquid formulation further contains a filler.

11. The method for producing a polymerization-reactive liquid formulation according to claim 1,
wherein the metathesis polymerization catalyst contained in the second preparative liquid formulation is a ruthenium carbene complex.

12. The method for producing a polymerization-reactive liquid formulation according to claim 1,
wherein the casing includes an ejection nozzle provided with the ejection port, and
the ejection nozzle includes a mount to which an attachment for charging or applying the polymerization-reactive liquid formulation to a molding target is attached.

13. The method for producing a polymerization-reactive liquid formulation according to claim 1,
wherein the mixing head further includes a mixing head cooler which cools the first preparative liquid formulation and the second preparative liquid formulation fed to the mixing chamber.

14. The method for producing a polymerization-reactive liquid formulation according to claim 1,
wherein the rotary mixer includes:
a first injector connected to the first chemical solution feeding port through a first pipe to feed the first preparative liquid formulation to the mixing head;
a second injector connected to the second chemical solution feeding port through a second pipe to feed the second preparative liquid formulation to the mixing head; and
a first pipe cooler disposed in the first pipe to cool the first preparative liquid formulation passing through the first pipe.

15. The method for producing a polymerization-reactive liquid formulation according to claim 14,
wherein the rotary mixer further includes a second pipe cooler disposed in the second pipe to cool the second preparative liquid formulation passing through the second pipe.

16. A method for producing a polymer, comprising a step of preparing a polymerization-reactive liquid formulation by the production method according to claim 1; and a step of polymerizing the polymerization-reactive liquid formulation.

* * * * *